(12) United States Patent
Alloin et al.

(10) Patent No.: US 9,042,498 B2
(45) Date of Patent: May 26, 2015

(54) DM-CM DIVERSITY RECEIVER FOR A WIRELINE COMMUNICATION SYSTEM

(71) Applicant: IKANOS COMMUNICATIONS, INC., Fremont, CA (US)

(72) Inventors: Laurent Francis Alloin, Monmouth Beach, NJ (US); Pravesh Biyani, Minneapolis, MN (US); Laurent Pierrugues, Fort Lee, NJ (US); S. M. Zafaruddin, Bangalore (IN); Chapala Vinay Kumar, Andhra Pradesh (IN)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 0 days.

(21) Appl. No.: 14/058,129

(22) Filed: Oct. 18, 2013

(65) Prior Publication Data

US 2014/0112381 A1    Apr. 24, 2014

Related U.S. Application Data

(60) Provisional application No. 61/715,788, filed on Oct. 18, 2012.

(51) Int. Cl.
| | |
|---|---|
| *H04B 1/10* | (2006.01) |
| *H04L 25/02* | (2006.01) |
| *H04L 25/03* | (2006.01) |
| *H04B 3/50* | (2006.01) |

(52) U.S. Cl.
CPC .............. *H04B 1/10* (2013.01); *H04L 25/0256* (2013.01); *H04L 25/03878* (2013.01); *H04L 25/0276* (2013.01); *H04B 3/50* (2013.01)

(58) Field of Classification Search
CPC ...... H04B 1/10; H04B 1/1027; H04B 1/1036; H04B 3/32; H04B 3/50; H04B 15/00; H04L 25/0256; H04L 25/0276; H04L 25/03878
USPC ......... 375/219, 222, 227, 229, 232, 260, 316, 375/346
See application file for complete search history.

(56) References Cited

U.S. PATENT DOCUMENTS

| | | | |
|---|---|---|---|
| 6,940,973 | B1 | 9/2005 | Yeap et al. |
| 8,144,807 | B2 * | 3/2012 | Mirfakhraei et al. ......... 375/296 |
| 2005/0053229 | A1 | 3/2005 | Tsatsanis et al. |
| 2010/0039182 | A1 | 2/2010 | Galton et al. |
| 2010/0322363 | A1 | 12/2010 | Ghobrial et al. |
| 2012/0013803 | A1 | 1/2012 | Oren et al. |

OTHER PUBLICATIONS

International Search Report and Written Opinion issued Jan. 21, 2014 for PCT/US2013/065792.

* cited by examiner

*Primary Examiner* — Leon Flores
(74) *Attorney, Agent, or Firm* — Pillsbury Winthrop Shaw Pittman LLP

(57) ABSTRACT

In general, the present invention provides methods and apparatuses for exploiting the extra degree of freedom provided by the sensing of the CM signal along with the DM signal at the receiver end of a wireline communication system. According to certain aspects, this extra degree of freedom can be used to cancel alien noises at the receiver in both upstream downstream directions. According to further aspects, a CM channel can be potentially used to exploit the diversity created in the CM channel along with the regular DM channel. This acts as the motivation for employing a diversity receiver scheme at the receiver, especially in downstream communications received at a Customer Premises.

18 Claims, 13 Drawing Sheets

DM-CM DIVERSITY RECEIVER FOR A WIRELINE COMMUNICATION SYSTEM

CROSS REFERENCE TO RELATED APPLICATIONS

This application claims priority under 35 USC 119(e) of prior U.S. Provisional Patent Application No. 61/715,788, filed Oct. 18, 2012, the contents of which are hereby incorporated by reference in their entirety.

FIELD OF THE INVENTION

The present invention relates generally to data communications, and more particularly to a DM-CM diversity receiver for a wireline communications system such as DSL.

BACKGROUND OF THE INVENTION

Data transmission in the copper twisted pair generally takes place over what is called a differential mode (DM) system. In the DM, the difference of the voltage between the two wires with respect to ground is transmitted while a two port loop is formed joining a transmitter, a receiver and the two twisted wires. Due to the imperfect twisting of the two wires, there is a leakage of the DM signal into what is known as the Common Mode (CM), with respect to the reference ground. The common mode voltage can be tapped from the center of the transformer at the DM transmitter or at the DM receiver with respect to the physical ground. The ground constitutes the return path of the CM signal carried by the two wires and joining the CM transmitter and receiver CM impedance and sensed through the center tap of the differential mode receiver with respect to ground.

SUMMARY OF THE INVENTION

In general, the present invention provides methods and apparatuses for exploiting the extra degree of freedom provided by the sensing of the CM signal along with the DM signal at the receiver end of a wireline communication system. According to certain aspects, this extra degree of freedom can be used to cancel alien noises at the receiver in both upstream downstream directions. According to further aspects, a CM channel can be potentially used to exploit the diversity created in the CM channel along with the regular DM channel. This acts as the motivation for employing a diversity receiver scheme at the receiver, especially in downstream communications received at a Customer Premises.

In accordance with these and other aspects, a receiver for a wireline communication system according to embodiments of the invention includes a differential mode (DM) sensor coupled to receive a signal of the wireline communication system and to produce a first signal representing the signal; a common mode (CM) sensor coupled to simultaneously receive the signal of the wireline communication system and to produce a second signal representing the signal; and a combiner that combines the first and second signals to yield a better estimate of a transmit symbol in the signal.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present inventors recognize that the sensing of CM signal in a wireline receiver can provide a new degree of freedom along with processing of the DM signal in a transceiver. This extra degree of freedom can be used to cancel alien noises at the receiver in both upstream and downstream direction. The present inventors further recognize that in a wireline communication system the CM receiver also senses a scaled copy of the useful DM transmitted signals along with the unwanted alien noise. Thus a CM receiver can be potentially used to exploit the diversity created in the CM channel along with the regular DM channel.

Figure 1:
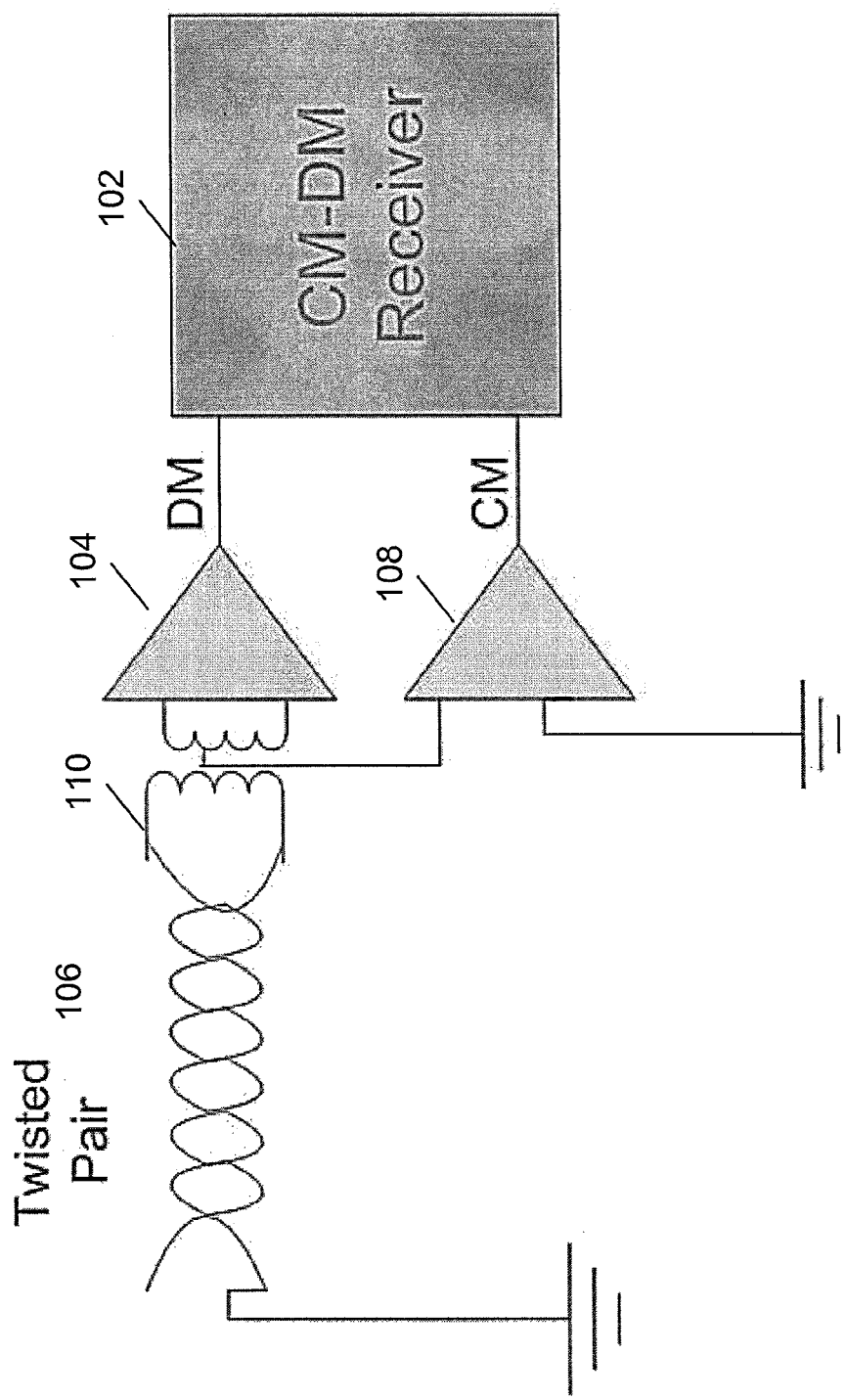
FIG. 1 is a block diagram of a CM-DM diversity receiver according to embodiments of the invention.

FIG. 1 is a block diagram illustrating an example CM-DM diversity receiver 102 according to aspects of the invention. As shown, it includes a DM sensor 104 coupled to the Tip and Ring (T&R) pair of a twisted pair 106 carrying data signals in a conventional wireline communication system such as DSL. As further shown, receiver 102 also includes a CM sensor 108 coupled to the T&R 110. The signals sensed by sensors 104 and 108 are processed by receiver 102 in a diversity scheme as will be described in more detail below.

Before providing such further details, the following provides an evaluation of the diversity available in the downstream direction of a VDSL system as has been recognized by the present inventors. This includes an evaluation of the leakage of the DM signal onto to the common mode channel from the perspective of this diversity and identifications of conditions under which such usage of CM can lead to significant rate improvements. In this evaluation, the CM channel and its underlying dynamics with the DM channel is examined. Then the diversity receiver structure at the DS receiver is described, along with the expressions of the gains that can be obtained using such structure. The evaluation further analyzes various possible scenarios of the achievable diversity and provides simulation results for those scenarios.

Common Mode Characterization

Figure 2:
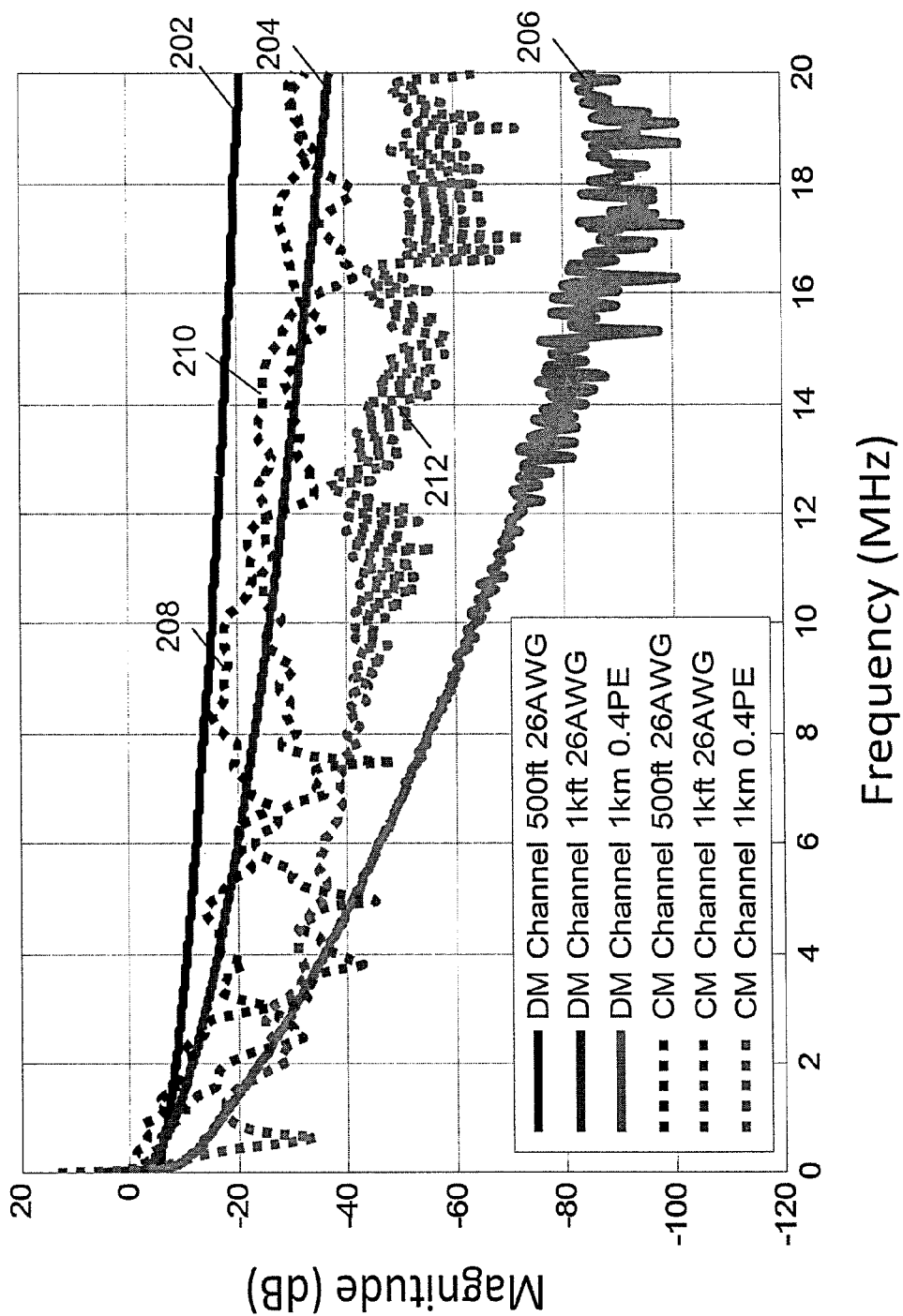
FIG. 2 is a graph illustrating various CM direct channel measurements vis-a-vis the DM channel.

The power of the common mode received data depends on two major CM environment characteristics. The first is the attenuation of the common mode direct channel and the other is the leakage from DM to the CM. FIG. 2 shows attenuation in dB of the measured CM and DM channel magnitude in dB as a function of frequency in MHz. Curves 202, 204 and 206 are measurements of attenuation of the DM channel over 500 ft. of 26 AWG cable, 1000 ft. of 26 AWG cable and 1 km of 0.4 PE cable, respectively. Curves 208, 210 and 212 are measurements of attenuation of the CM channel over the same wires. From FIG. 2, it is easy to see that the CM channel generally exhibits more attenuation for the shorter loops as compared to the corresponding DM channel, while for the 1 km loop, it exhibits lesser attenuation.

The interplay of signal leakage between the DM and CM signals is governed by four basic measures. Longitudinal conversion loss (LCL) represents the degree of unwanted conversion of a differential mode signal following the presence of a common mode signal on one side of a two port network. Longitudinal conversion transfer Loss (LCTL) represents the degree of unwanted conversion of a differential mode signal at the output of a two-port network following the presence of a common mode signal at the input port.

Transverse Conversion Loss (TCL) represents the degree of unwanted conversion of a common mode signal following the presence of a differential mode signal on one side of a two port network. Transverse conversion transfer loss (TCTL) represents the degree of unwanted conversion of a common mode signal at the output of a two-port network following the presence of a differential mode signal at the input port. Based on construction of a twisted pair, the LCL and TCL measurements are typically symmetrical, and the same generally applies for the LCTL and TCTL measurements. Since the effectiveness of the diversity receiver is dependent on the signal leaking from the DM to the CM, the TCL and the TCTL of the cable under study are important characteristics for common mode receiver.

To study TCL and TCTL, various measurements were performed using the 500 ft. and 1 kft AWG 26 cable and 1 km 0.4 mm PE cable.

Figure 3:
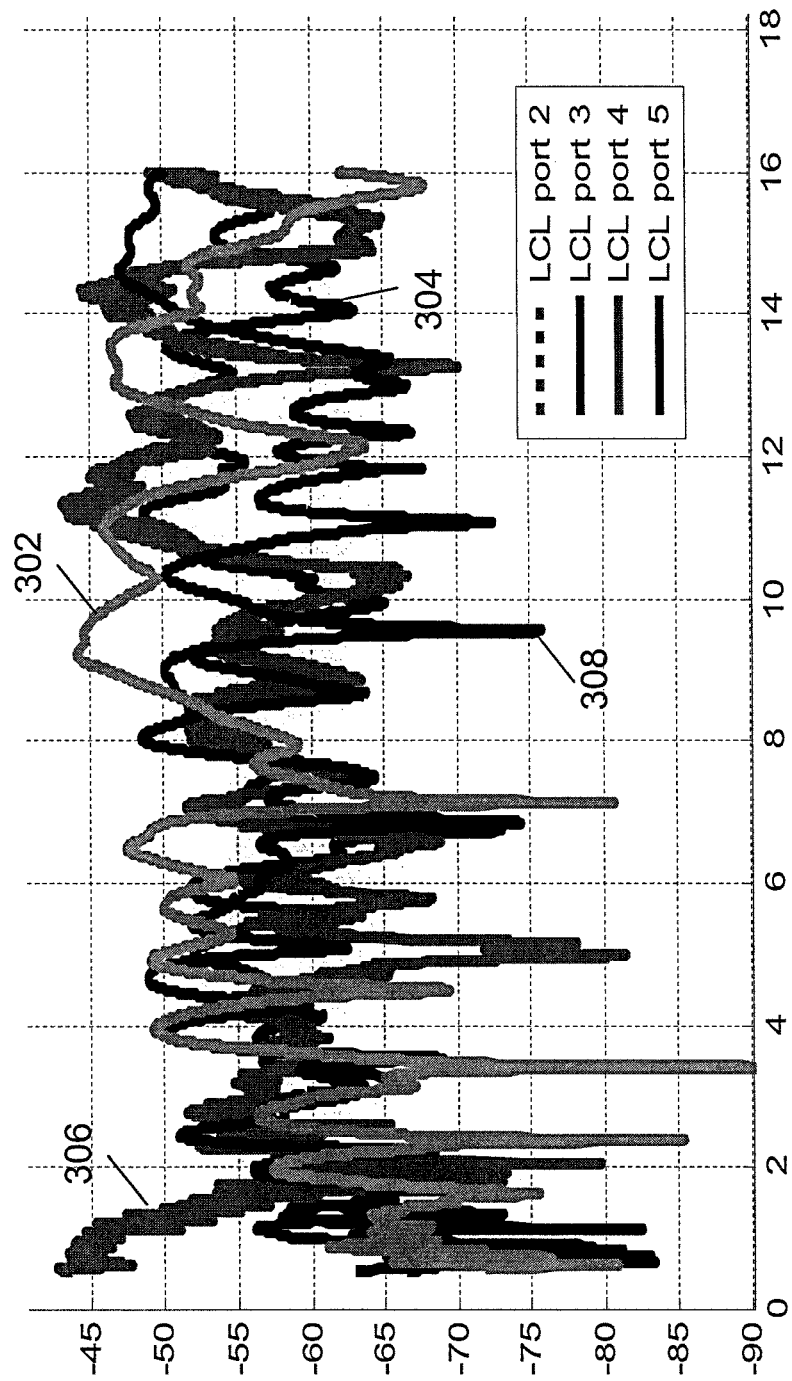
FIG. 3 is a graph illustrating LCL measurements for 500 ft. AWG 26 cable.
Figure 4:
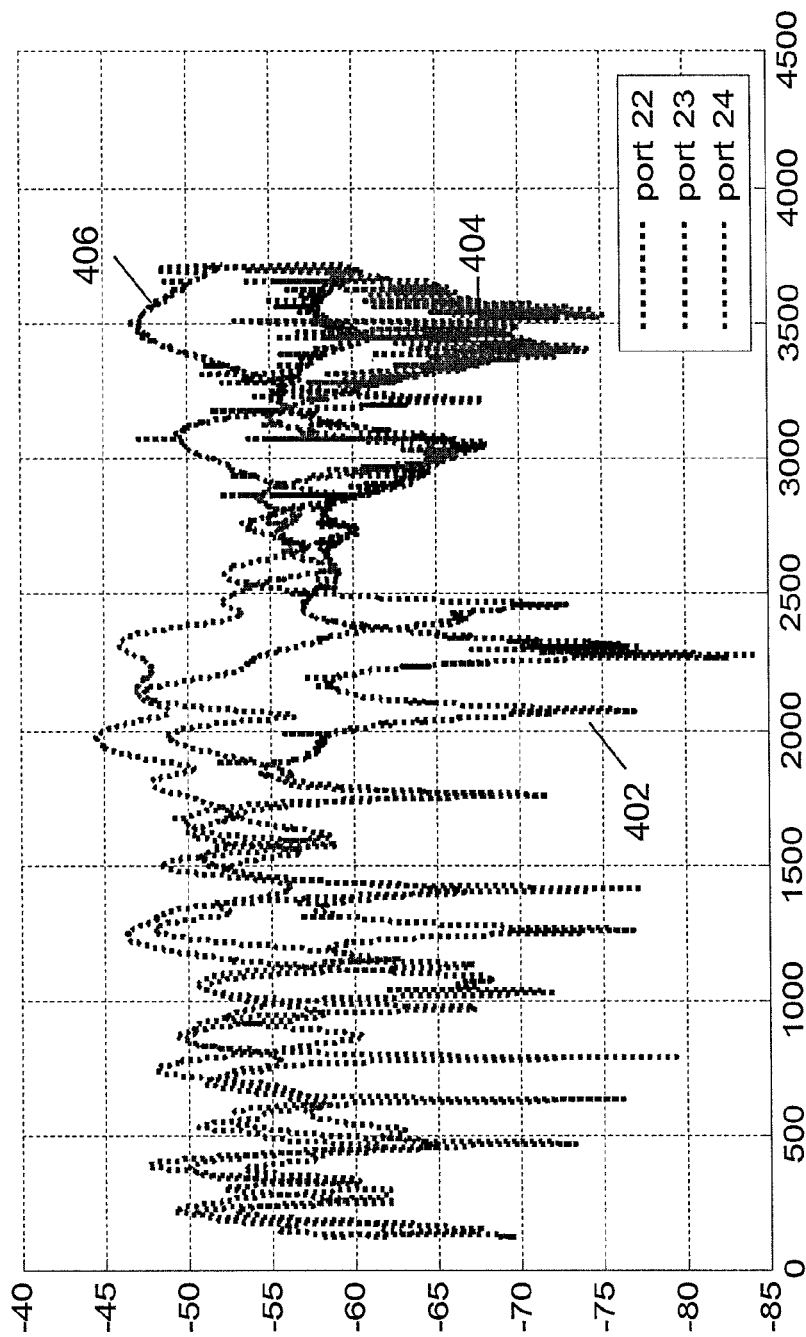
FIG. 4 is a graph illustrating LCL measurements for 1 KM 0.4 mm PE cable.

The two plots in FIGS. 3 and 4 shows the LCL measured in 500 ft. AWG 26 and 1 km 0.4 mm PE cable respectively. Specifically, FIG. 3 is a graph illustrating LCL measurements in dB for LCL port 2 (curve 302), port 3 (curve 304), port 4 (curve 306) and port 5 (curve 308) for 500 ft. AWG 26 cable as a function of frequency, where the different ports correspond to different twisted pairs in a multiple pair cable. Likewise, FIG. 4 is a graph illustrating LCL measurements in dB for LCL port 22 (curve 402), LCL port 23 (curve 404) and LCL port 24 for a 1 km 0.4 mm PE cable as a function of DSL tone numbers of 4.3125 kHz spacing.

As shown, the unwanted DM to CM conversion at the transmitter varies from 50 dB to 70 dB in both the cables. In these measurements, it seems there is a very little to conclude on the LCL vis-à-vis the cable length. One should note that the signal leakage from the DM to the CM through the mechanism of the LCL then goes through the direct channel of the CM and, which is then received by the CM receiver.

Figure 5:
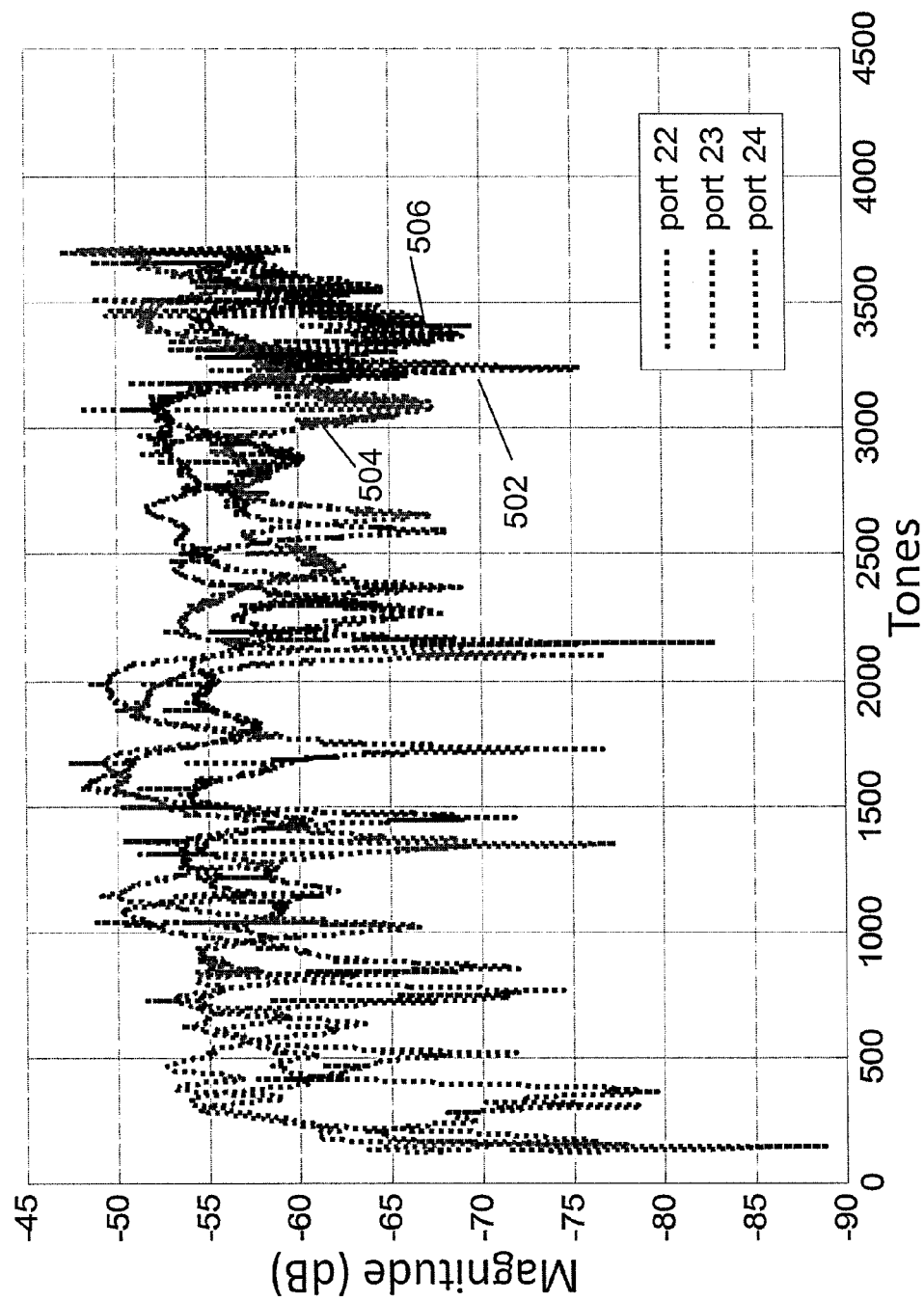
FIG. 5 is a graph illustrating LCTL measurements for the 500 ft. Cable.
Figure 6:
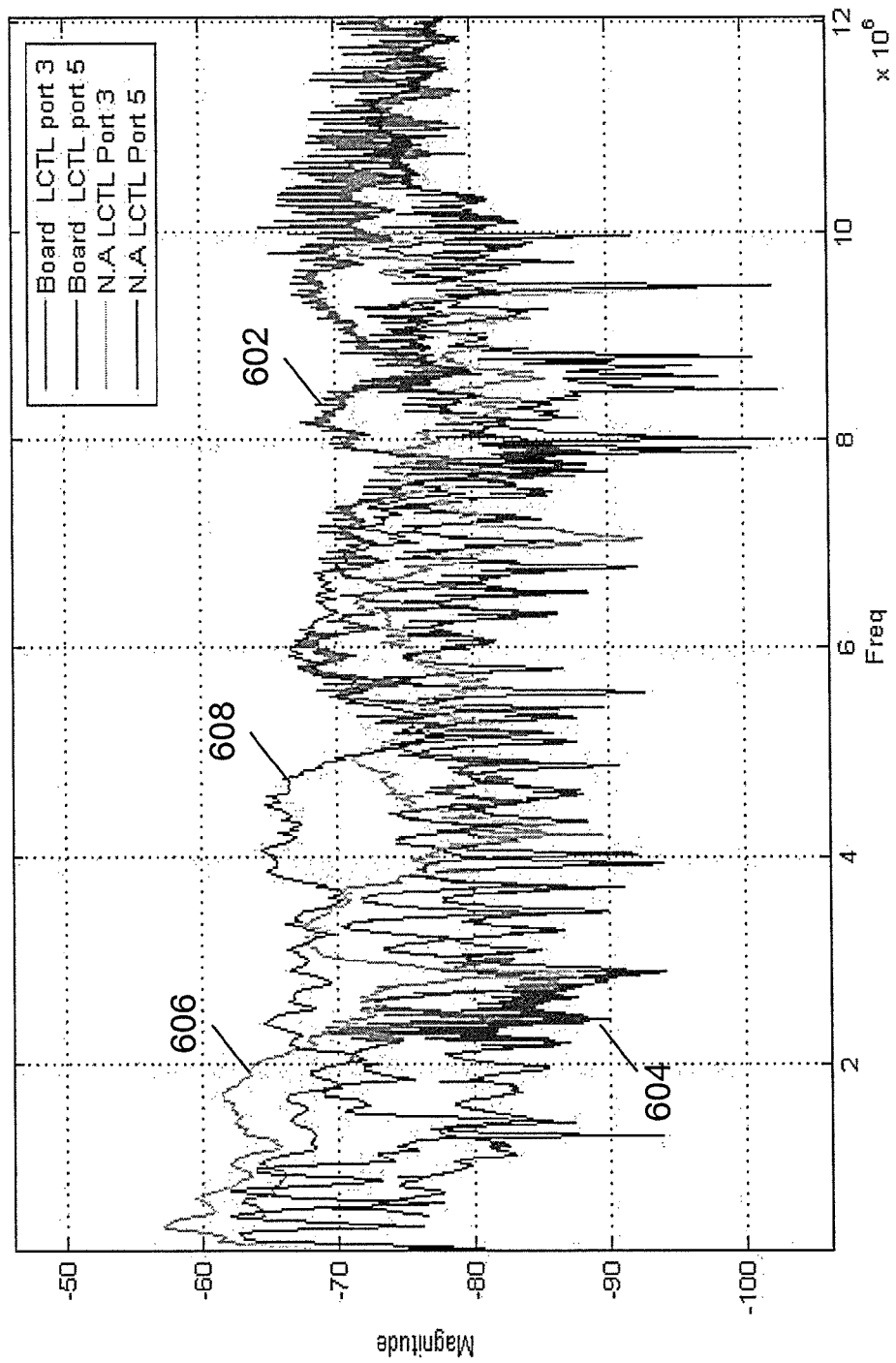
FIG. 6 is a graph illustrating LCTL measurements for the 1 KM 0.4 mm PE Cable, note that the measurements are valid only till 10 MHz.
Figure 7:
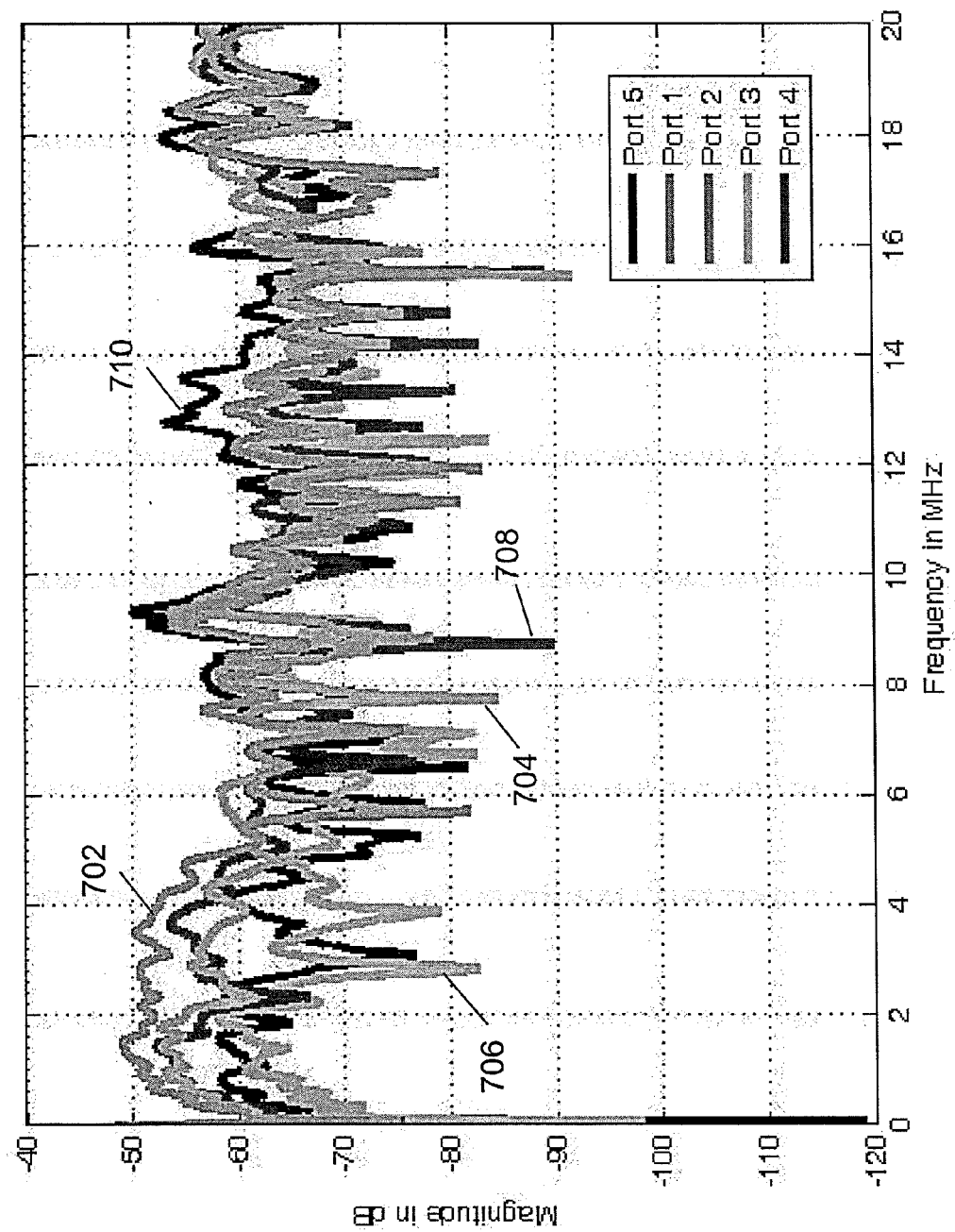
FIG. 7 is a graph illustrating LCTL measurements for the 300 m AWG 26 Cable.
Figure 8:
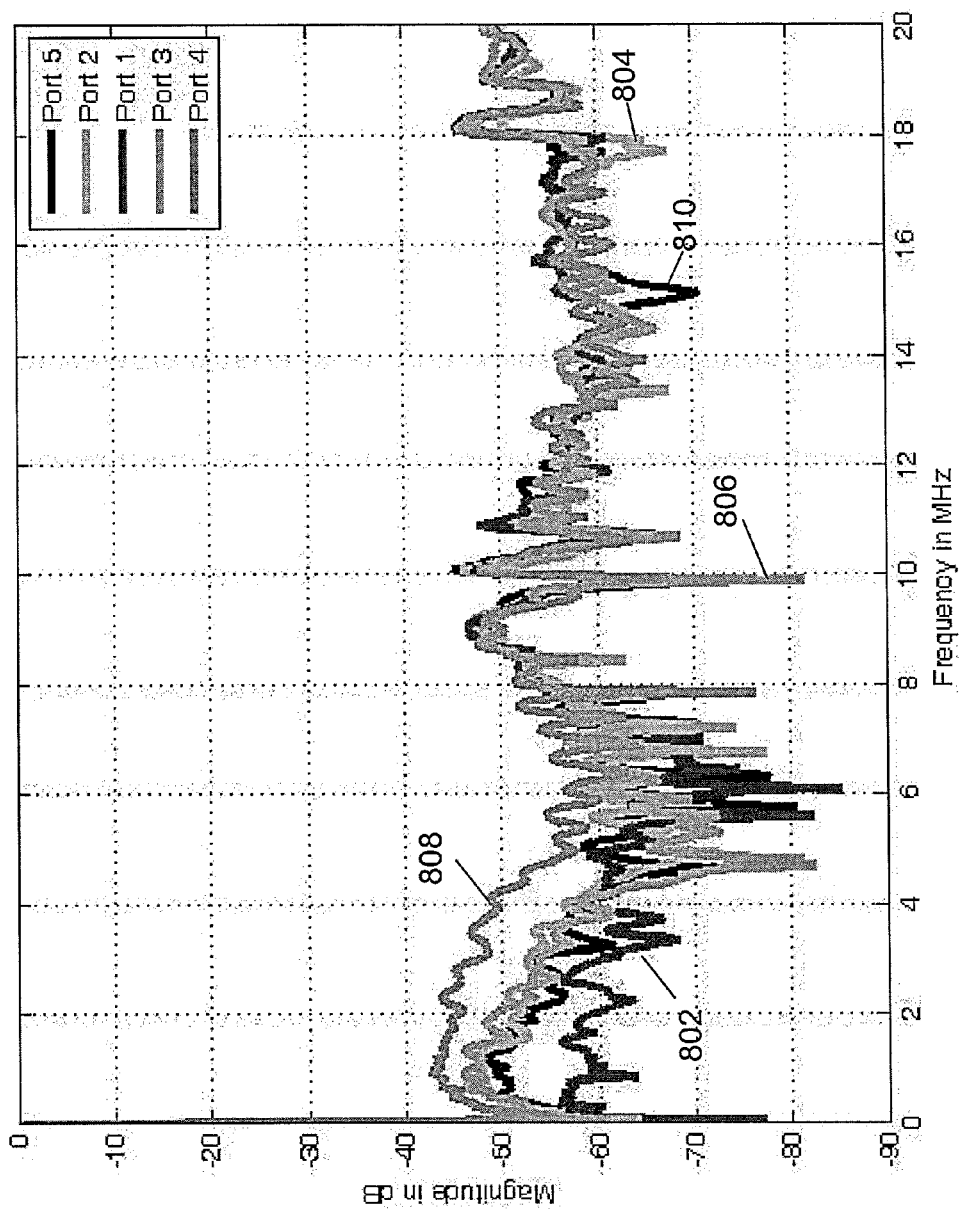
FIG. 8 is a graph illustrating LCTL measurements for the 400 m AWG 26 Cable.

The plots in FIGS. 5 to 8 show the LCTL for the 500 ft, 300 m, 400 m and 1 km cable bundles. Specifically, FIG. 5 is a graph illustrating LCTL measurements in dB for LCTL port 22 (curve 502), port 23 (curve 504) and port 24 (curve 506) for the 500 ft. cable as a function of DSL tone numbers of 4.3125 kHz spacing. FIG. 6 is a graph illustrating LCTL measurements in dB for board LCTL port 3 (curve 602), board LCTL port 4 (curve 604), N.A. LCTL port 3 (curve 606) and N.A. LCTL port 5 (curve 608) for the 1 KM 0.4 mm PE Cable as a function of frequency. Note that the measurements are valid only till 10 MHz. FIG. 7 is a graph illustrating LCTL measurements in dB for LCTL port 1 (curve 702), LCTL port 2 (curve 704), LCTL port 3 (curve 706), LCTL port 4 (curve 708) and LCTL port 5 (curve 708) for the 300 m AWG 26 Cable as a function of frequency. FIG. 8 is a graph illustrating LCTL measurements in dB for LCTL port 1 (curve 802), LCTL port 2 (curve 804), LCTL port 3 (curve 806), LCTL port 4 (curve 808) and LCTL port 5 (curve 808) for the 400 m AWG 26 Cable.

As can be seen from these graphs, the LCTL magnitude for the 500 ft. cable varies roughly from 50 to 60 dB, while for the 1 km cable, it varies from 65 to 80 dB. The 300 m and 400 m plot shows the LCTL to be around 60 dB. It is clear that DM to CM conversion not only takes place at the transmitter, but also along the cable. Such observation can be derived by noting that despite the CM channel attenuation expected on the cable, the LCTL figures roughly have the magnitude as the LCL figures measured at the transmitter end of the cable. It can be said using the above measurements and observations that LCTL would be a dominant component of the received signal power at the receiver. Lower LCTL magnitude would mean lower loss and hence higher received signal power in CM, leading to more diversity.

Figure 9:
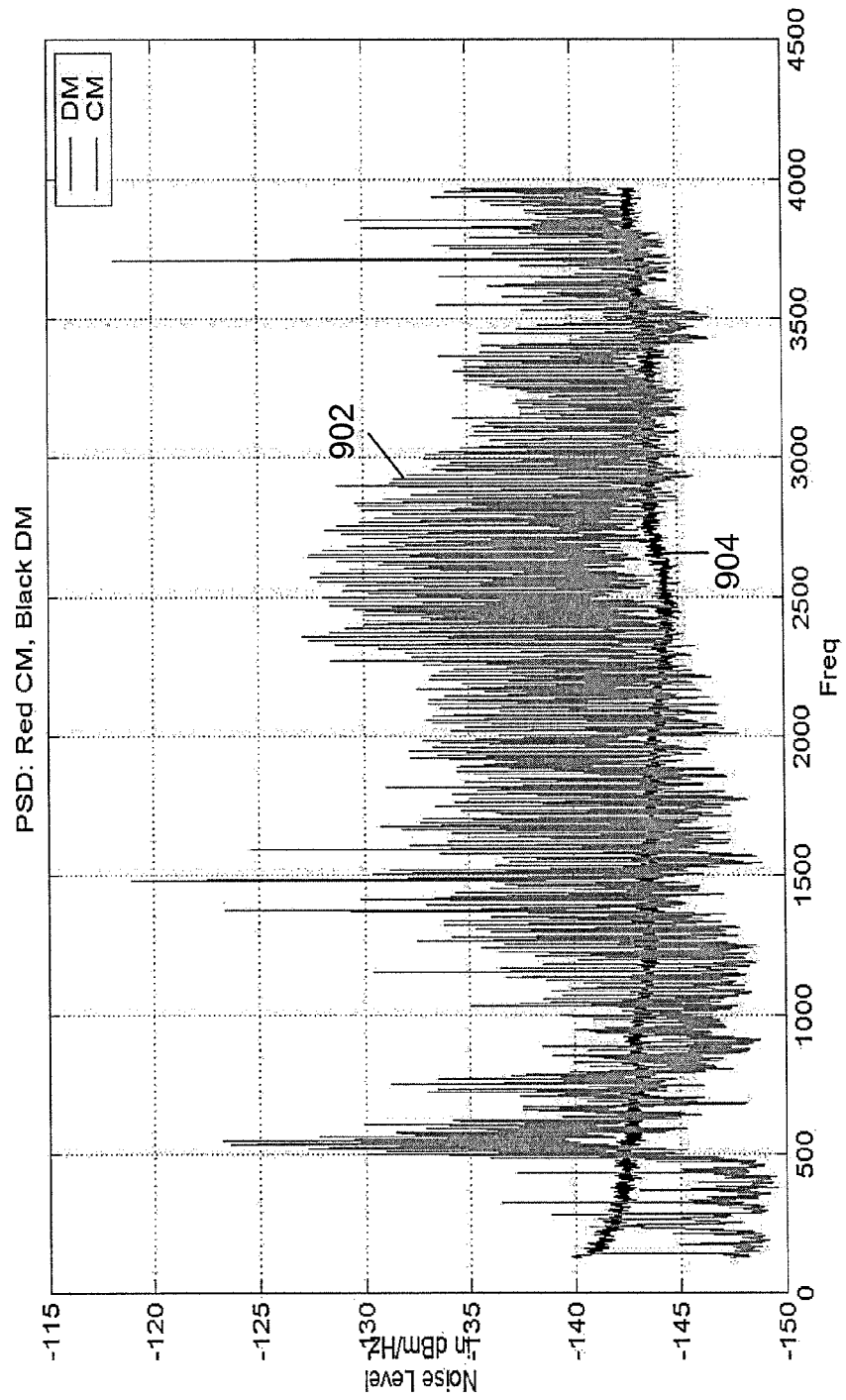
FIG. 9 is a graph illustrating receiver noise PSD in the CM and the DM.

The receiver noise in the DM is generally assumed to be circular Gaussian with PSD around −140 dBm/Hz, and the inventors have found it to be consistent during measurements. However, the receiver noise at the CM found to be higher than the DM additive noise. Moreover, the noise deviated from being Gaussian across in many tones. This may impact the performance of the diversity receiver. The plot in FIG. 9 illustrates the PSD of the receiver noise, with curve 902 illustrating the noise in CM, and curve 904 illustrating the noise in DM.

Besides leveraging the natural imbalance of the cable, which converts part of the transmit differential mode signal to usable common mode signal at the far end receiver, one can envisage a controlled leakage at the transmitter side of the transmit DM signal into the CM which can in turn carry the intentionally leaked signal through the CM path to the far end receiver. The fact that CM has lesser direct channel attenuation than the corresponding DM can be leveraged through this scenario. This may result in higher SNR at the CM receiver as compared to the DM receiver and thus a potential gain in the bit-rate. However, the leakage at the transmitter side is constrained by the allowed power of the EM radiation. Plus, this low level CM leaked signal will suffer from the CM mode attenuation through the cable.

In terms of allowed EM radiation, ITU and ANSI do not specify longitudinal output voltage. The FCC, or more accurately, the TIA does. The TIA has a mandate from the FCC to regulate telecom equipment that is connected to the telephone network. The latest TIA spec is TIA-968-B which was issued in August 2009 and went in effect Mar. 22, 2011 provide the following emission limits for VDSL in band and out of band signaling as follows:

|  | TIA Standard | Equivalent dBm/Hz value |
|---|---|---|
| In band | −50 dBV (4 kHz) | −76 dBm/Hz (100 Ω) |
| Out of band | −80 dBV (4 kHz) | −106 dBm/Hz (100 Ω) |

There is no requirement above 30 MHz for conducted longitudinal signals.

Applied to a VDSL2 PSD Mask, and a DS3 limit of −50.5 dBm/Hz, a controlled imbalance of 30 dB of the transmitter in the DS3 band yield −80.5 dBm/Hz of Longitudinal limit which satisfies the TIA standard of −76 dBm/Hz. As a consequence, the controlled leakage of the useful signal to common mode at the transmitter would become of significant contribution to a diversity receiver, whenever the difference of attenuation of the differential path with respect to that of the common mode path reaches the range of 30 dB.

Diversity Receiver Derivation

A derivation for the expression for an example diversity receiver at the CPE according to embodiments of the invention will now be provided. The optimality of the current receiver assumes gaussianity of the receive noise at both CM and DM. It is also assumed that the self-FEXT among the vectored users have been taken care of due to the precoding at the CO. The per-tone received symbols at the receiver in the DM and the CM are given by the following equations:

$$y_d = h_d x + v_d$$

$$y_c = h_c x + v_c \quad \text{equation 1:}$$

Here, $y_d$ is the receive symbol at the DM, $y_c$ is the receive symbol at the CM. $h_d$ and $h_c$ are the transfer functions for the DM and CM channels respectively. Similarly, $v_d$ and $v_c$ are the additive receiver noise at DM and CM. Note that $h_c$ includes the TCTL component of the leakage through the cable as well as the signal flowing through the direct channel of the CM emanating from a controlled leakage of CM signal at the transmitter.

Figure 10:
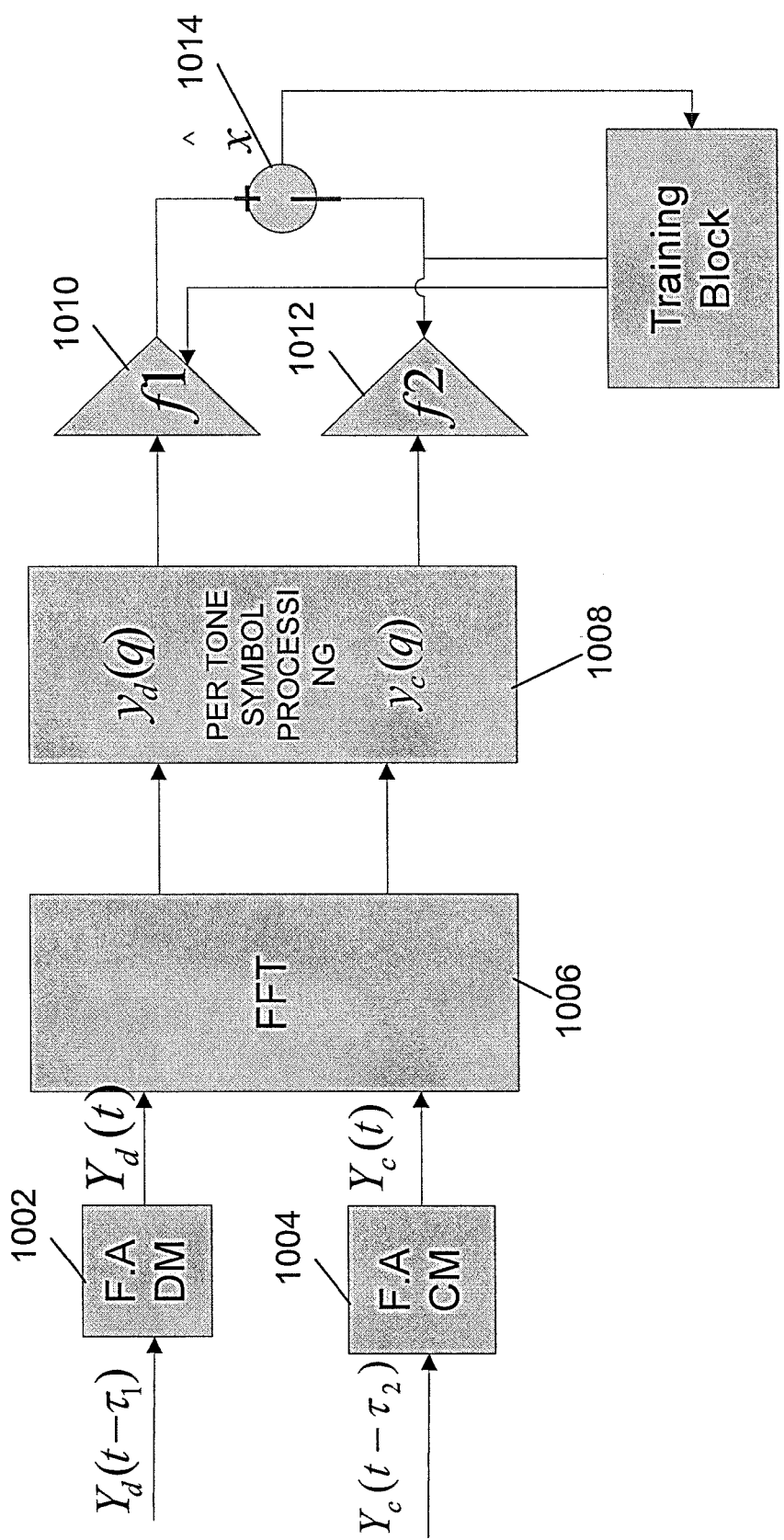
FIG. 10 is a schematic illustrating an example linear combiner according to embodiments of the invention.

FIG. 10 is a block diagram of an example diversity receiver according to embodiments of the invention. As shown, it receives differently delayed signals $Y_d(t-\tau_1)$ and $Y_c(t-\tau_2)$ from the DM and CM sensors, respectively, and produces a combined output estimate of the received data, $\hat{x}$. Implementation details of the components shown in the example of FIG. 10 will become apparent from the descriptions below.

As shown in FIG. 10, frame alignment is done at the receiver before the FFT operation is performed to identify the start of the frame, since there is a group delay associated with the direct channel. Note that there will be different group delays for the two paths of CM and DM. Hence, one may wish to align the frames of the CM and DM path separately to identify the beginning of the frame. However, in the case when the difference of the group delays between the CM and the DM path is negligible, one may decide to use the DM frame-alignment to also align the CM frame, as the cyclic prefix could be big enough to handle the slight offset of CM and DM path relative delays.

However, for larger loop lengths and for higher frequencies the difference of the group delay might be large enough to necessitate a separate frame-alignment operation for the CM path.

To proceed, it is assumed that the frame-alignments 1002 and 1004 are separate for CM and DM paths, respectively, and hence there is no efficiency loss due to this. The aligned samples from both paths after frame alignment are converted to frequency domain by FFT 1006.

Linear Combiner with Frequency Domain Equalizer (FEQ).

Traditionally a per tone FEQ is used to equalize the direct channel of DM. One may envision a similar scheme for the CM too. Assuming that the two sets of FEQs are operating one may combine the equalized CM and DM received symbols linearly.

Let $\tilde{y}_d$ and $\tilde{y}_c$ be the equalized received symbols in the DM and the CM respectively from block 1008.

The ML estimate of the transmit symbol x is found given the observations at the DM and the CM. The ML estimate based receiver at the CPE is given by combining the received symbols at the CM and DM linearly by elements 1010, 1012 and 1014 in the following equation:

$$\hat{y} = \alpha_1 \tilde{y}_c + \alpha_2 \tilde{y}_d$$

Here, $\hat{y}$ is the resulting symbol after the combination. Note that estimate $\hat{x}$ of the transmit symbol x is obtained by slicing $\hat{y}$.

The factor $\alpha_1$ is obtained using the following equation:

$$\alpha_1 = \frac{|h_c|^{-2} \sigma_c^2}{|h_c|^{-2} \sigma_c^2 + |h_d|^{-2} \sigma_d^2}$$

And $\alpha_2$ is given by $1 - \alpha_1$ (for the specific case of independent Gaussian noise). The resulting $SNR_{cd}$, referred as is simply given by:

$$SNR_{cd} = SNC_c + SNR_d$$

The above equation shows that the SNR of both the CM and the DM has to be maximized separately to ensure optimal SNR on linear combination.

Linear Combiner without FEQ, an MMSE Approach.

The example receiver shown in FIG. 10 includes a linear combiner according to embodiments of the invention.

The MMSE estimate of the linear combiner is given by the following equation. Let $$f = [f_1, f_2]^T, Y = [y_d, y_c]^T$$

Then it follows that:

$$f = E\{YY^h\}^{-1} E\{Y^* x\}$$

The LMS recursion for f is given by:

$$f[t_{n+1}] = f[t_n] - \nu Y^* e$$

Where, ν is the LMS step size and e is the error given by $$e = x - [f_1 f_2] Y$$

Linear Combiner without FEQ. An MOE Approach.

A linear constrained receiver termed as MOE can be used as an alternative to the MMSE training. The MOE receiver puts a constraint h_d x=1 on the Wiener solution to get:

$$\hat{x} = f^H y^{cd}$$

where $$y^{cd} = [y_d, y_c]^T$$

And $$f = (h_{cd}^H R_y^{-1})^{-1} R_y^{-1} h_{cd}$$

is the optimal linear combiner, and $$hcd = [hd, hc]^T$$

It can be seen that the linear combiner f depends on direct paths of CM and DM channel, which are easily available. It further follows that:

$$Ry = \Sigma ycd ycd^H$$

is the received data covariance matrix and which can be estimated easily. Note that both the MOE and the MMSE estimate of the canceller achieve the same solution, whenever no useful signal is picked up by the CM sensor.

An MOE or MMSE approach for the training of the canceller can be applied conditionally on a per tone basis to achieve overall optimal results, whenever leakage of transmit useful signal and external noise is correlated between the CM and DM ports. In this situation, the MMSE approach is expected to yield best results, since the optimization will minimize the impact of the external noise, while constructively add leakage CM useful signal to the DM useful signal.

Simulation Results

Figure 11:
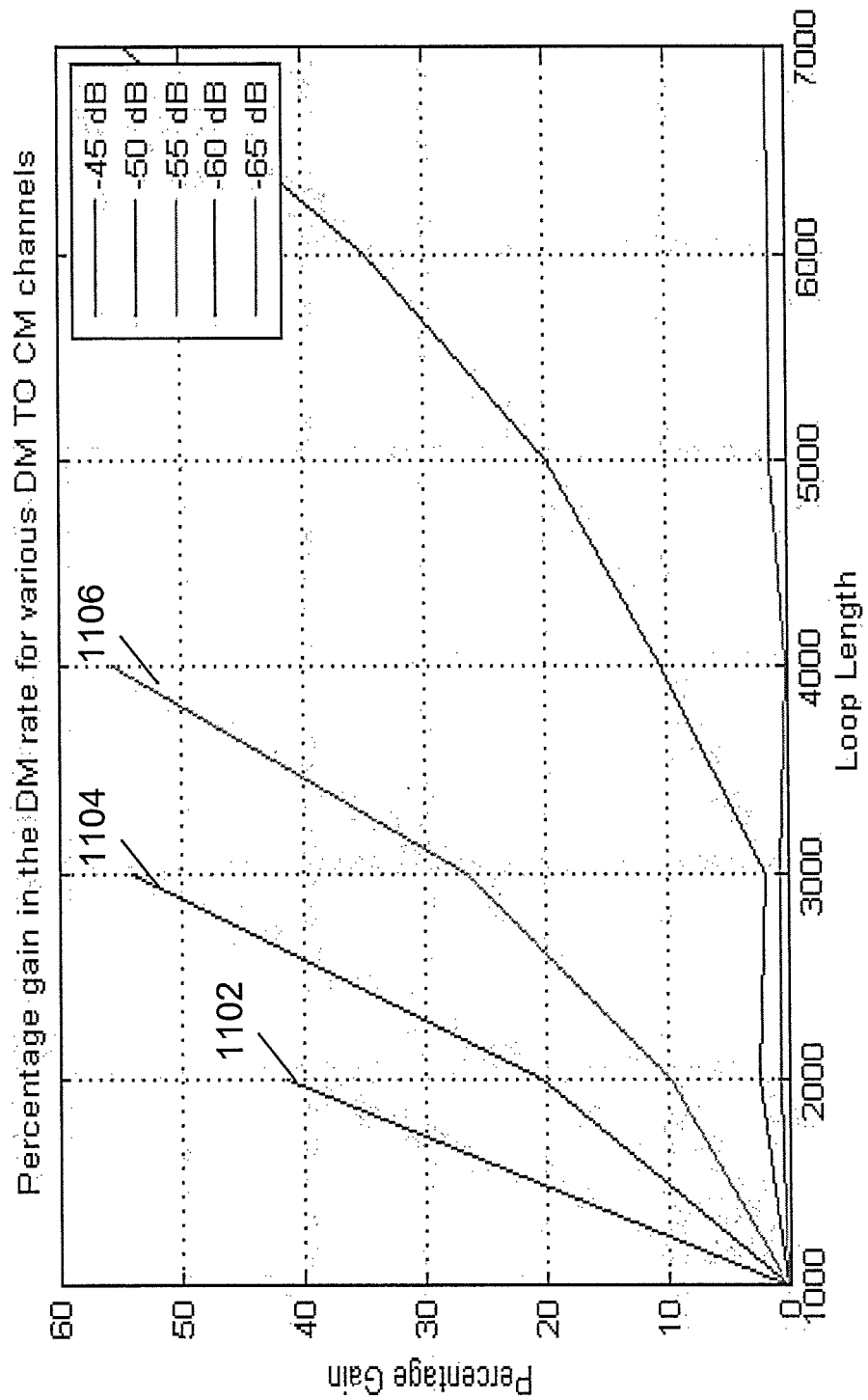
FIG. 11 is a graph illustrating percentage gain using a diversity receiver as a function of loop length in simulation results implementing aspects of the invention.

Simulations employing the diversity receiver for various TCTL numbers for various loop lengths have been performed by the present inventors. The plot in FIG. 11 shows the percentage gain obtained over traditional DM when the diversity receiver is employed for various scenarios. Note that the x axis of the plot is the loop length in feet and the for the CM the receiver noise level is assumed to be −130 dBm/Hz, while it is −140 dBm/Hz for the DM. The transmit PSD used is adapted from G.993.2 Annex A 30a profile. The y axis indicates the percentage gain in the rate on the use of the linear diversity receiver. For example, curve 1106 gives the percentage gain in the rate when the TCTL was assumed to be 55 dB flat over all the tones. Note that although one will never encounter a flat TCTL over entire frequency range, the curves in the plot gives us a fair idea on what TCTL should one expect for a certain level of gain.

The results show that there is a considerable amount of gain in the event of 45 dB to 55 dB DM to CM transfer function loss (curves 1102, 1104 and 1106 in FIG. 11). The rate tables below indicate the partition of the above gain in the three DS bands for two TCTL values of 50 dB and 55 dB. Note that the gains mainly come in the DS2 and DS3 bands. The data rate (listed in Mbps) are derived for a awg26 wire, AWGN level of −140 dBm/Hz for the DM, and PSD level defined for VDSL. The bit rate computation is derived from the SNR capacity estimate and bit a loading allocation table traditionally used in DSL.

TABLE 1

Rate and gains in various bands for 45 dB of TCTL

| | 1000 ft. | | 2000 ft. | | 3000 ft. | | 4000 ft. | |
|---|---|---|---|---|---|---|---|---|
| DS 1 | 50.2 (DM) | 50.2 (Comb.) | 48.3 | 48.4 | 40.4 | 40.5 | 29.9 | 31.5 |
| DS 2 | 45.9 | 45.9 | 27.5 | 27.9 | 6.9 | 15.7 | 0 | 15.3 |
| DS 3 | 105.9 | 105.9 | 6.9 | 40.8 | 0 | 40.8 | 0 | 40.8 |
| Total | 201.1 | 201.1 | 82.7 | 117.1 | 47.3 | 97.2 | 29.9 | 77.6 |

TABLE 2

Rate and gains in various bands for 55 dB of TCTL

| | 1000 ft. | | 2000 ft. | | 3000 ft. | | 4000 ft. | |
|---|---|---|---|---|---|---|---|---|
| DS 1 | 50.2 (DM) | 50.2 (Comb) | 48.3 | 48.4 | 40.4 | 40.4 | 29.9 | 30.1 |
| DS 2 | 45.9 | 45.9 | 27.5 | 27.5 | 6.9 | 9.2 | 0 | 6.1 |
| DS 3 | 105.8 | 105.8 | 6.8 | 14.9 | 0 | 10.2 | 0 | 10.2 |
| Total | 201.1 | 201.1 | 82.6 | 90.7 | 47.3 | 59.8 | 29.9 | 46.4 |

It is evident from the discussion above that the performance of the diversity receiver depends upon the conversion in the DM to CM of the useful signal. More conversion implies higher diversity and hence more gain. Looking at the measured values of the TCTL in FIGS. 3, 4, 5 and 6, it appears that the TCTL conversion lies close to 60 dB for around 1000 ft. and 70 dB for higher loop lengths. From FIG. 11, it further appears that one cannot expect much overall gain by using a diversity receiver in such situations. However, between 12 and 17 MHz, the DS3 band in many cases can be used in CM mode, on shorter loop lengths, where the DS3 signal on the DM is not sufficient to ensure loading of useful data, but where leakage in CM is predominant. It should also be noted that these simulations were performed with an assumption on the background noise at the CM sensor. The change in the real life background noise statistics can alter the recommendations in either direction. For e.g. a lower background noise of −140 dBm/Hz in CM can provide higher gains than expected.

Diversity Receiver Versus Noise Canceller

Equation 1 presents the described case of the diversity receiver when no external correlated noise is present on the DM and CM channel. Practical scenarios show however that a twisted pair is usually subject to external noise such as crosstalk, RFI or powerline noise. These noises are also present on the CM sensor and it has been established that a second sensor using a CM sensor is a good candidate to mitigate the impact of the external noise in the DM channel. The scheme proposed in connection with FIG. 10 indeed allows the implementation of the dual receiver canceller when the DM and the CM are subject to correlated noise only without useful signal on the CM sensor:

$$y_d = h_d x + CI + v_d$$

$$y_c = I + v_c \quad \text{Equation 2}$$

where Hd are the useful signal direct channel for the DM channel; I the external noise present on the CM channel and C the noise coupling channel from the CM to the DM channel. The concept of the noise canceller is well known. In some scenarios both useful signal and external noise will be found on the DM and the CM sensors:

$$y_d = h_d x + CI + v_d$$

$$y_c = h_c x + I + v_c \quad \text{Equation 3}$$

The receiver structure presented in FIG. 10 suits the training of the diversity receiver or of the noise canceller but it will not have the capability to do both simultaneously as there is no solution that allows to add constructively the useful signal while cancelling the external noise in order to maximize the SNR of this degenerated system. As the diversity receiver and the noise canceller are not based on the same criteria for optimization (equalization of the useful signal versus minimization of the noise), we introduce a method to decide whether the dual FEQ structure should be trained for one or the other criteria.

In the case of the diversity receiver, the output of the dual FEQ is:

$$Y_{output} = F_1 Y_{dm} + F_2 Y_{cm} \quad \text{Equation 4}$$

Where $F_1$ and $F_2$ respectively the inverse of the direct DM and CM channels:

$$F_1 = \frac{1}{H_d}; F_2 = \frac{1}{H_c} \quad \text{Equation 5}$$

In the case of the noise canceller, F1 is the inverse of the direct DM channel and F2 the opposite of the CM to DM channel:

$$F_1 = \frac{1}{H_d}; F_2 = -C \quad \text{Equation 6}$$

When the dual FEQ is learnt in presence of leakage of useful signal and external noise $F_1$ and $F_2$ respectively are equal to:

$$F_1 = \frac{1}{H_d}; F_2 = \frac{H_d H_c^* \sigma_x^2 + C \sigma_I^2}{|H_c|^2 \sigma_x^2 + \sigma_I^2 + \sigma_{w_c}^2} \quad \text{Equation 7}$$

The joint dual FEQ training (Eq 7) in the presence of both useful signal and external noise is not optimal, but tends to approach Eq. 5 in the case of Diversity receiver or Eq. 6 in the case of the Noise canceller. Therefore the best mode of operation is estimated during the discovery phase of the training which can be extended to the training phase and the data mode phase.

Figure 12:
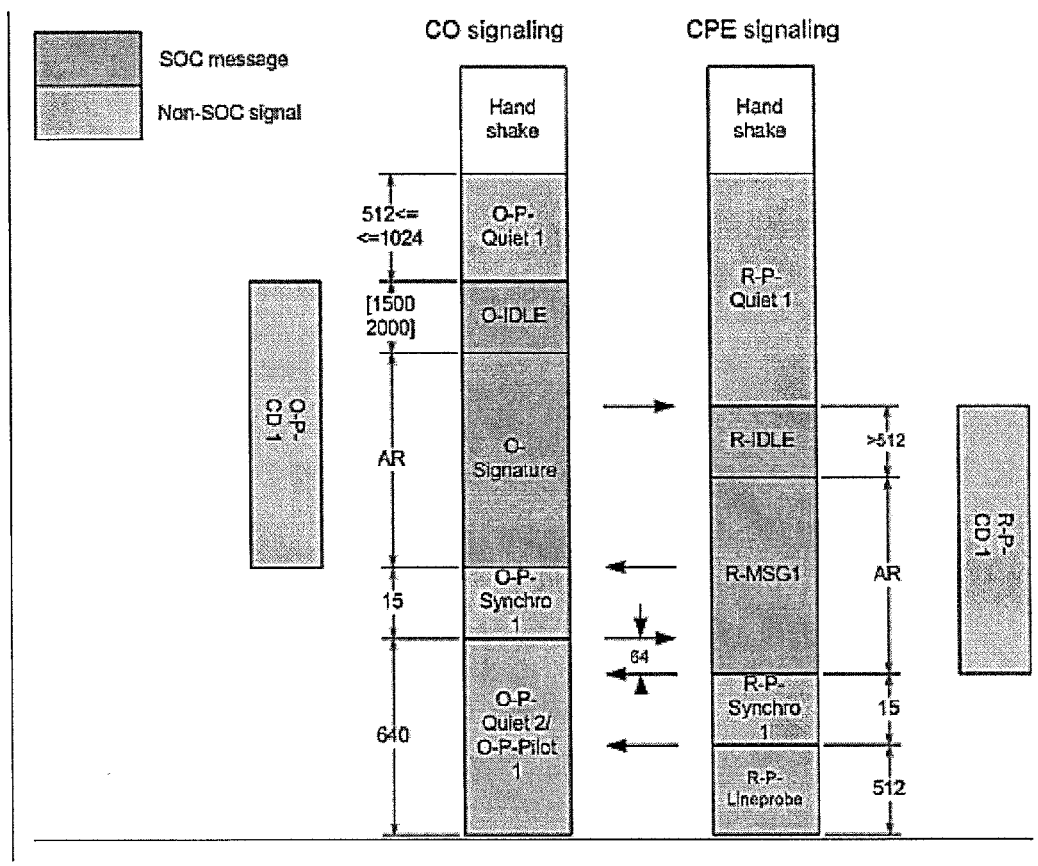
FIG. 12 is a flowchart illustrating a portion of an initialization sequence of a VDSL system that can be used in embodiments of the invention.

FIG. 12 presents the standardized Transmit sequences by the CO and CPE in a VDSL startup protocol, during which the diversity receiver is being trained. Specifically, the training of the diversity receiver will take place with information gathered during two defined sequences of the protocol, namely O-P-Quiet-1 and O-Idle.

In order to choose whether the dual FEQ should be trained in a diversity receiver mode or a noise canceller mode, SNR estimated on CM sensor can be used as a metric.

When the SNR estimated on CM sensor, expressed as:

$$SNR_{CM} = \frac{|H_c|^2 \sigma_x^2}{\sigma_I^2 + \sigma_{w_c}^2} \quad \text{Eq. 8}$$

is positive, the diversity receiver bound tells us that there is always a gain in terms of SNR, when the dual FEQ coefficients are obtained in diversity receiver mode Eq. 5.

When SNR on CM sensor is negative, the dual FEQ coefficients are learned in a noise cancellation mode.

Hence the training and estimation of the dual FEQ coefficients should be as follows.

Step 1: Learn Noise canceller dual FEQ coefficients Eq 6 in O-P-Quiet 1 as no useful signal is transmitted by the CO.

Step 2: During O_IDLE phase, estimate SNR on CM sensor Eq (8)

Step 3: If the SNR on CM sensor is positive, learn the dual FEQ coefficients in Diversity Receiver mode and apply in further stages of training and data mode.

Step 4: If the SNR on CM sensor is negative, apply the dual FEQ coefficients in Noise canceller mode and apply in further stages of training and data mode.

Alternatively, the best mode of the receiver can be determined by comparing the SNR bound obtained during a joined dual FEQ training (Eq. 7) and given in equation (10) below to the two equations corresponding to the bounds for true diversity receiver (Eqs. 5 and 11) and canceller mode Eqs. 6 and 12) as follows.

$$SNR_{MIMO} = \frac{\{UNR_{DM} INR_{CM} + UNR_{CM} INR_{DM} - (\rho_i \rho_I^* + \rho_i^* \rho_I) + \sqrt{UNR_{DM} UNR_{CM} (INR_{CM} - 1)(INR_{DM} - 1)}\}}{\{INR_{DM} + INR_{CM} - 1 + (1 - |\rho_i|^2)(INR_{DM} - 1)(INR_{CM} - 1)\}} \quad \text{Eq. 10}$$

$$SNR = UNR_{DM} + UNR_{CM} \quad \text{Eq. (11)}$$

$$SNR = \frac{UNR_{DM} INR_{CM}}{\{INR_{DM} + INR_{CM} - 1 + (1 - |\rho_i|^2)(INR_{DM} - 1)(INR_{CM} - 1)\}} \quad \text{Eq. (12)}$$

where $\rho_i$ and $\rho_I$ are external noise correlation and useful signal correlation between DM and CM sensors respectively; external noise to background noise ratio (INR) and useful signal to background noise ratio (UNR) are defined as follows $$INR_{DM} = \frac{|C|^2 \sigma_{I_c}^2 + \sigma_{w_d}^2}{\sigma_{w_d}^2} \quad INR_{CM} = \frac{\sigma_{I_c}^2 + \sigma_{w_c}^2}{\sigma_{w_c}^2}$$

$$UNR_{DM} = \frac{|H_d|^2 \sigma_x^2}{\sigma_{w_d}^2} \quad UNR_{CM} = \frac{|H_c|^2 \sigma_x^2}{\sigma_{w_c}^2}$$

The quantities in Eq. (10) can be derived as follows. External noise correlation $\rho_i$ is nothing but the correlation between received signals on DM and CM sensors during O-P-QUIET phase as these are free from useful signal component. During O-IDLE phase, correlation between the received signals on both the sensors is given by $$\rho_{IDLE} = \frac{\rho_I \sqrt{UNR_{DM} UNR_{CM}} + \rho_i \sqrt{(INR_{DM} - 1)(INR_{CM} - 1)}}{\sqrt{(UNR_{DM} + INR_{DM})(UNR_{CM} + INR_{CM})}}$$

In order to derive $\rho_i$ from $\rho_{IDLE}$, it is necessary to determine the following quantities $UNR_{DM}$, $UNR_{CM}$, $INR_{DM}$ and $INR_{CM}$. $INR_{DM}$ and $INR_{CM}$ can be easily estimated during the O-P-Quiet phase by estimating the variance of the received signal over the estimated background noise variance on each of the sensors respectively. UNR ($UNR_{DM}$, $UNR_{CM}$) can be estimated in one or two ways. The first method of estimating UNR can be performed in the O-Idle phase. Since in O-IDLE, CO transmits known useful signal, an FEQ can be trained on both the sensors to have estimates of Hd and Hc. From there, the received useful signal power on each sensor can be estimated, hence UNR.

An alternative method in estimating UNR is done while receiving signal in O-P-QUIET and O-IDLE in a three step process.

Step 1: Receive signal in O-P-QUIET, measure $INR_{DM}$ and $INR_{CM}$ $$DM: Y_d = CI_c + W_d$$

$$CM: Y_c = I_c + W_c$$

$$INR_{CM} = \frac{\sigma_{I_c}^2 + \sigma_{w_c}^2}{\sigma_{w_c}^2} \quad INR_{DM} = \frac{|C|^2 \sigma_{I_c}^2 + \sigma_{w_d}^2}{\sigma_{w_d}^2}$$

Step 2: Receive signal in O_IDLE, measure variance of received signal over variance of the background noise $$DM: Y_d = HdX + CI_c + W_d$$

$$CM: Y_c = HcX + I_c + W_c$$

$$PSD_{DM} = \frac{|Hd|^2 \sigma_x^2 + \sigma_{I_d}^2 + \sigma_{w_d}^2}{\sigma_{w_d}^2} \quad PSD_{CM} = \frac{|Hc|^2 \sigma_x^2 + \sigma_{I_c}^2 + \sigma_{w_c}^2}{\sigma_{w_c}^2}$$

Step 3: Estimate of UNR by subtracting the two quantities.

$$UNR_{DM} = PSD_{DM} - INR_{DM}$$

$$UNR_{CM} = PSD_{CM} - INR_{CM}$$

During the above three steps, it is assumed that the background noise variances have been—previously estimated in absence of external noise—assumed equal to a default value such as −140 dBm/Hz. The results of the three steps could also be obtained through alternate process such as: applying the division by the background noise on current Step 3 instead of current steps 1 and 2 which conduct step 1 and 2 to be only the estimation of the received signal PSD.

Based on these estimates, equation (10) can be evaluated and compared to the evaluation of equation (11) and equation (12). For any tone, which evaluation of equation (10) is closest to the evaluation of equation (11), the dual FEQ $F_1$ and $F_2$ should be used in a diversity receiver mode, independently deriving $F_1$ and $F_2$ as per equation 5. For any tone, which evaluation of equation (10) is closest to the evaluation of equation (12), the dual FEQ $F_1$ and $F_2$ should be used in a noise canceller mode, deriving $F_1$ and $F_2$ as per equation 6.

The determination of which mode the canceller is to be trained in ensures that given a certain level of leakage of useful signal and a certain level of correlated noise on each sensor, the dual FEQ adopts the best possible configuration.

To summarize the above process of determining mode, if the SNR on CM sensor is positive, then the dual FEQ should be used in a diversity receiver mode, independently deriving $F_1$ and $F_2$ as per equation 5. Otherwise it should be used in a noise canceller mode, deriving $F_1$ and $F_2$ as per equation 6. However one can exploit Diversity Receiver even in the case of negative SNR on CM.

The per-tone coefficients $F_1$ and $F_2$ are then populated and updated for the rest of the training and data mode according to the mode for which they have been determined. This decision criteria can be applied on a per tone basis, such that for some tones the per tone dual FEQ structure $F_1$ and $F_2$ is used in a diversity receiver mode, while for other tones it will be used in a noise canceller mode.

Figure 13:
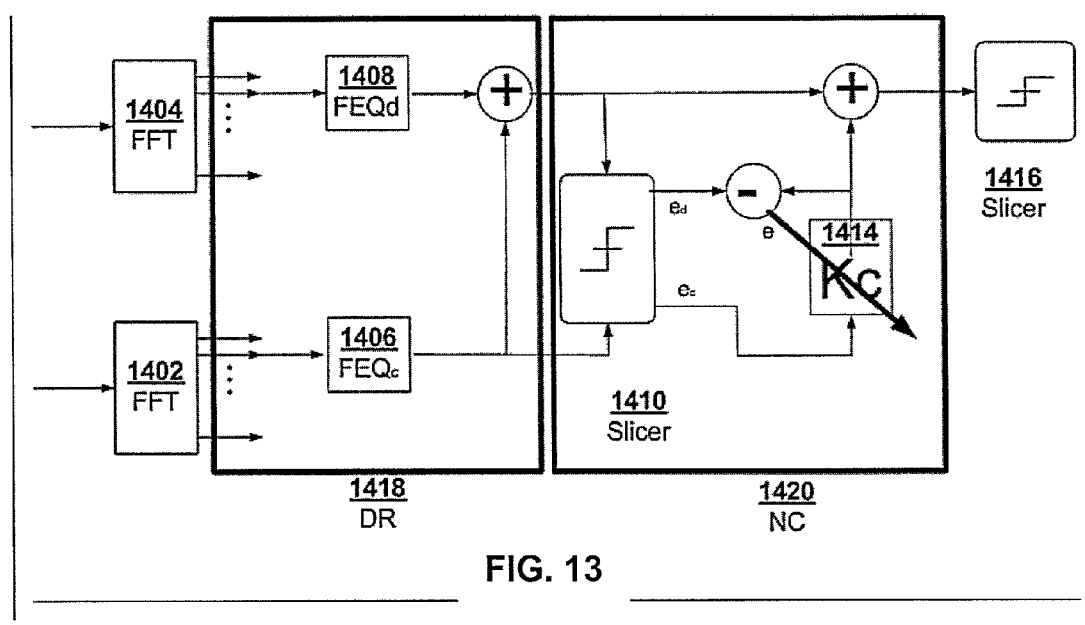
FIG. 13 is a schematic illustrating another example linear combiners according to embodiments of the invention.

An alternative structure to that of the receiver structure presented in FIG. 10 which is limited to either being a Diversity receiver or a Noise Canceller is illustrated in FIG. 13. This structure lifts the degeneracy of the system, that now allows adding constructively the useful signal while cancelling the external noise. FIG. 13 consists in a structure, which can be seen as the cascade of a diversity receiver 1418, followed by a noise canceller 1420. The diversity receiver is similar to FIG. 10 and is trained according to equation 5. The Noise Canceller Kc 1414 takes as input the error signal $e_c$ sliced by slicer 1410, and add its output to the combiner output to be presented to the final slicer 1416. The Noise Canceller Kc 1414 is updated based on an error signal e that is obtained from the subtraction of the canceller output and the sliced error $e_d$ obtained by slicing the differential mode input to the canceller by slicer 1410. In effect, the Noise Canceller 1420 eliminates the correlated external noise that remains in signal $e_d$ and $e_c$ after slicing both CM and DM paths of the Diversity receiver. This cascaded structure allows the Diversity Receiver section of the receiver to add constructively the leaked useful signal sensed on the CM sensor to that of the differential mode sensor, while the noise canceller eliminates the correlation of the external noise without affecting the diversity receiver. The structure presented in FIG. 13 is however prone to incorrect slicing decisions on both DM and CM sensors. An erroneous slicing operation of slicer 1410 leads to possible erroneous $e_d$ and $e_c$ terms which may lead to error propagation in the canceller output and an erroneous update of the canceller for the given symbol. In order to provide reliable error terms $e_d$ and $e_c$. Slicer 1410 is implemented using a slicing operation that can be performed jointly or separately with Diversity Receiver Combiner and CM signal outputs: slicer error terms $e_c$ and $e_d$ can be derived by slicing the output of FEQc 1406 and the output of the Diversity Receiver Combiner independently. Alternatively, in scenarios where the SNR on the Diversity Receiver Combiner output is greater than that on the output of FEQc 1406, slicer error $e_c$ can be derived from the decision on the estimate of the transmit signal obtained from the more reliable Diversity Receiver Combiner output only. Alternatively, error terms $e_d$ and $e_c$ can be derived in slicer 1410 from a joint decision on the estimate of the transmit signal obtained based on both outputs of FEQc 1406 and the output of the Diversity Receiver Combiner.

Resorting to the use of the structure depicted in FIG. 13 results from a determination of the quantities $UNR_{DM}$, $UNR_{CM}$, $INR_{DM}$ and $INR_{CM}$ and $\rho_i$ and $\rho_j$, external noise correlation and useful signal correlation between DM and CM sensors respectively and $SNR_{DM}$, $SNR_{CM}$, that will determine whether Diversity Receiver should be used for which tone, and whether it should be followed by a noise canceller on which tone Generalization While the diversity receiver architecture is expected to be implemented as a per tone linear combiner in the frequency domain, the concept of diversity recombining can be performed in the time domain with linear filtering techniques.

Although the invention has been described herein in connection with a particularly useful application to DSL communications over conventional telephone lines, the invention is not limited to this application. Rather, the principles of the invention can be extended to various types of wireline transmission systems such as coaxial cable systems, including, for example, Multi-Media over COAX (aka MoCA), HPNA (including HPNA 3.1 over COAX as well as in home twisted pair), IEEE P1901 (PLC over in home power line), Home Plug (including HPAV and HPAV2 and "green PLC"), and ITU-T G.hn (including twisted pair, power line, base-band coax and RF coax).

Moreover, although the invention has been described herein in a particularly useful application as being embedded in a CPE and analyzing downstream signals, the invention can also be implemented in a CO an analyzing upstream signals.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A receiver for a wireline communication system, comprising: a differential mode (DM) sensor coupled to receive a signal of the wireline communication system and to produce a first signal representing the signal; a common mode (CM) sensor coupled to simultaneously receive the signal of the wireline communication system and to produce a second signal representing the signal; and a combiner that combines the first and second signals to yield a better estimate of a transmit symbol in the signal, wherein over a range of tones the combiner is configured as a diversity receiver, while over another range of tones the combiner is configured as a noise canceller.

2. A receiver according to claim 1, wherein the signal is a multitone signal and wherein the combination is performed on a per tone basis in a frequency domain using a linear combiner.

3. A receiver according to claim 2, wherein training of the linear combiner is performed using a minimum mean square error (MMSE) criteria.

4. A receiver according to claim 2, wherein training of the linear combiner is performed using a minimum output energy (MOE) criteria.

5. A receiver according to claim 2, wherein over a range of tones the linear combiner is reduced to a single input frequency domain equalizer (FEQ) that equalizes the second signal, when the first signal is deemed unusable.

6. A receiver according to claim 2, further comprising a frame aligner for respectively frame aligning the first and second signals.

7. A receiver according to claim 6, wherein the frame alignment is performed prior to conversion of the first and second signals to a frequency domain.

8. A receiver according to claim 2, wherein the combining is done as a cascade of a diversity receiver combination followed by a noise canceller combination over a range of tones.

9. A receiver according to claim 2, further comprising a slicer for processing an output of the combiner and for producing input error signals for a noise canceller.

10. A receiver according to claim 9, wherein the slicer produces the error signals based on a decision of an estimated transmit symbol, which is derived from the combiner output.

11. A receiver according to claim 9, wherein the slicer produces the error signals based on a decision of an estimated transmit symbol, which is derived jointly from the combiner output and the second signal of the CM sensor.

12. A receiver according to claim 9, wherein the slicer produces the error signals based on decisions of estimated transmit symbols, that are derived independently from the combiner output and from the second signal of the CM sensor.

13. A receiver according to claim 1, wherein the DM and CM sensors are both connected to a twisted pair loop.

14. A receiver according to claim 1, wherein the DM and CM sensors are both connected to a coax cable.

15. A receiver according to claim 1, wherein the DM and CM sensors are both connected to a power mains network.

16. A method of training a receiver comprising a DM sensor for receiving a signal and producing a first signal corresponding to the signal, and a CM sensor for receiving the signal and producing a second signal corresponding to the signal, wherein the first and second signals are combined to yield a better estimate of a transmit symbol in the signal, the method comprising:
    computing a signal to noise ratio (SNR) of the CM channel;
    based on the computed SNR, determining a first range of tones in which combining the first and second signals is performed in a diversity receiver configuration, and determining another range of tones in which combining the first and second signals is performed in a noise canceller configuration.

17. A method of training a receiver comprising a DM sensor for receiving a signal and producing a first signal corresponding to the signal, and a CM sensor for receiving the signal and producing a second signal corresponding to the signal, wherein the first and second signals are combined to yield a better estimate of a transmit symbol in the signal, the method comprising:
    computing a first signal to noise ratio (SNR) of a diversity receiver method
    computing a second SNR of a noise canceller method
    computing a third SNR of the joint dual FEQ method
    based on which of the first, second and third SNR's is highest, determining a first range of tones in which combining the first and second signals is performed in a diversity receiver configuration, determining another range of tones in which combining the first and second signals is performed in a noise canceller configuration, and finally determining another range of tones in which combining the first and second signals is performed in a joint training configuration.

18. A wireline communication system, comprising:
    a differential mode (DM) sensor coupled to receive a signal of the wireline communication system and to produce a first signal representing the signal;
    a common mode (CM) sensor coupled to simultaneously receive the signal of the wireline communication system and to produce a second signal representing the signal; and
    a combiner that combines the first and second signals to yield a better estimate of a transmit symbol in the signal; and
    a far end transmitter connected to the DM and CM sensors through a loop, that outputs a controlled level of leaked CM signal originating from the signal, in order to improve the better estimate of the transmit symbol.

* * * * *